US010970138B2

(12) United States Patent
Damaggio et al.

(10) Patent No.: US 10,970,138 B2
(45) Date of Patent: Apr. 6, 2021

(54) MODULAR APPLICATIONS USING A COMMON PROVISIONING SERVICE

(71) Applicant: Microsoft Technology Licensing, LLC, Redmond, WA (US)

(72) Inventors: Elio Damaggio, Redmond, WA (US); Chipalo Street, Seattle, WA (US); Eustace Ngwa Asanghanwa, Kirkland, WA (US); Angelo Roncalli de Novaes Pires Ribeiro, Kirkland, WA (US); Damon Luke Barry, Redmond, WA (US); Arjmand Samuel, Redmond, WA (US); Michael R. Yagley, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 15/639,375

(22) Filed: Jun. 30, 2017

(65) Prior Publication Data

US 2018/0331916 A1  Nov. 15, 2018

Related U.S. Application Data

(60) Provisional application No. 62/503,787, filed on May 9, 2017.

(51) Int. Cl.
*G06F 15/173* (2006.01)
*G06F 9/54* (2006.01)
(Continued)

(52) U.S. Cl.
CPC .............. *G06F 9/542* (2013.01); *G06F 8/60* (2013.01); *G06F 8/654* (2018.02); *G06F 9/547* (2013.01);
(Continued)

(58) Field of Classification Search
None
See application file for complete search history.

(56) References Cited

U.S. PATENT DOCUMENTS 6,671,809 B1  12/2003  Perona et al.
7,275,098 B1   9/2007  Becher et al.
(Continued)

FOREIGN PATENT DOCUMENTS

WO   2014182692 A1   11/2014

OTHER PUBLICATIONS

Damaggio, Elio et al.; "Creation of Modular Applications With Corresponding Twins in the Cloud"; U.S. Appl. No. 15/639,403, filed Jun. 30, 2017; 34 pages.
(Continued)

*Primary Examiner* — Phyllis A Book
(74) *Attorney, Agent, or Firm* — David Chin; Chin IP, PLLC

(57) ABSTRACT

The disclosed technology is generally directed to IoT technology. In one example of the technology, the following actions are performed for each module of a plurality of modules on a first edge device. An identification message that includes information associated with identification of the module is received. The validity of the module is then verified. After the module is verified, based at least in part on the identification message, an IoT support service is selected from a plurality of IoT support services. The module is then caused to be registered with the selected IoT support service. The plurality of modules are compositable together into an application for the first edge device. The modules of the plurality of modules are capable of being used interoperably with other modules without altering the other modules.

18 Claims, 8 Drawing Sheets

(51) Int. Cl.

| | | |
|---|---|---|
| *H04L 29/08* | (2006.01) | |
| *H04L 12/24* | (2006.01) | |
| *G06F 16/27* | (2019.01) | |
| *G06F 8/654* | (2018.01) | |
| *H04W 12/00* | (2021.01) | |
| *G06N 5/04* | (2006.01) | |
| *G06F 8/60* | (2018.01) | |
| *H04L 29/06* | (2006.01) | |
| *G06N 20/00* | (2019.01) | |
| *H04W 4/70* | (2018.01) | |
| *G06N 3/02* | (2006.01) | |
| *G06F 8/61* | (2018.01) | |
| *G06F 9/44* | (2018.01) | |

(52) U.S. Cl.
CPC .............. *G06F 16/27* (2019.01); *G06N 5/046* (2013.01); *H04L 41/0806* (2013.01); *H04L 41/0813* (2013.01); *H04L 41/0846* (2013.01); *H04L 41/12* (2013.01); *H04L 67/1095* (2013.01); *H04L 67/12* (2013.01); *H04L 67/125* (2013.01); *H04L 67/34* (2013.01); *H04W 12/0023* (2019.01); *G06F 8/61* (2013.01); *G06F 8/64* (2013.01); *G06F 9/44* (2013.01); *G06N 3/02* (2013.01); *G06N 20/00* (2019.01); *H04L 63/20* (2013.01); *H04L 67/28* (2013.01); *H04W 4/70* (2018.02); *H04W 12/009* (2019.01)

(56) References Cited

U.S. PATENT DOCUMENTS

| | | | |
|---|---|---|---|
| 9,262,152 | B1 | 2/2016 | Kurian et al. |
| 9,606,817 | B1 | 3/2017 | Efstathopoulos |
| 9,686,362 | B2 | 6/2017 | Choi et al. |
| 9,977,415 | B2 | 5/2018 | Zimmerman et al. |
| 10,171,371 | B2 | 1/2019 | Anwar et al. |
| 10,241,221 | B2 | 3/2019 | Elder et al. |
| 10,262,019 | B1 | 4/2019 | Reiner et al. |
| 10,268,524 | B2 | 4/2019 | Sainaney |
| 10,270,827 | B2 | 4/2019 | Lawrence |
| 10,404,569 | B2 | 9/2019 | Hershey et al. |
| 10,521,223 | B1 | 12/2019 | Bogushefsky et al. |
| 2007/0283002 | A1 | 12/2007 | Bornhoevd et al. |
| 2012/0233668 | A1 | 9/2012 | Leafe et al. |
| 2014/0059226 | A1 | 2/2014 | Messerli et al. |
| 2014/0241354 | A1 | 8/2014 | Shuman et al. |
| 2015/0106616 | A1 | 4/2015 | Nix |
| 2015/0195365 | A1 | 7/2015 | Choi et al. |
| 2015/0288619 | A1 | 10/2015 | Fritsch |
| 2015/0347114 | A1 | 12/2015 | Yoon |
| 2016/0088049 | A1 | 3/2016 | Seed et al. |
| 2016/0124404 | A1 | 5/2016 | Oh et al. |
| 2016/0197773 | A1 | 7/2016 | Pandrangi et al. |
| 2016/0247129 | A1 | 8/2016 | Song et al. |
| 2016/0248746 | A1* | 8/2016 | James ................ G06F 21/45 |
| 2016/0259627 | A1 | 9/2016 | Michelsen et al. |
| 2016/0285979 | A1* | 9/2016 | Wang ................ H04L 67/16 |
| 2016/0357525 | A1 | 12/2016 | Wee et al. |
| 2017/0005820 | A1 | 1/2017 | Zimmerman et al. |
| 2017/0006135 | A1 | 1/2017 | Siebel et al. |
| 2017/0105131 | A1* | 4/2017 | Song ................ H04W 4/70 |
| 2017/0126628 | A1* | 5/2017 | Krishna ............ H04L 63/0428 |
| 2017/0168777 | A1 | 6/2017 | Britt |
| 2017/0171607 | A1 | 6/2017 | Britt |
| 2017/0235585 | A1 | 8/2017 | Gupta et al. |
| 2017/0257341 | A1* | 9/2017 | Arsenault ............ H04L 67/16 |
| 2017/0287090 | A1 | 10/2017 | Hunn et al. |
| 2017/0310549 | A1 | 10/2017 | Nagesh et al. |
| 2017/0364542 | A1 | 12/2017 | Chou et al. |
| 2018/0049179 | A1 | 2/2018 | Shah |
| 2018/0091506 | A1* | 3/2018 | Chow ................ G06Q 20/145 |
| 2018/0091624 | A1 | 3/2018 | Forbes |
| 2018/0101585 | A1 | 4/2018 | Curtis |
| 2018/0102934 | A1 | 4/2018 | Ly et al. |
| 2018/0143825 | A1* | 5/2018 | Noens ................ G06F 8/77 |
| 2018/0165131 | A1 | 6/2018 | O'hare et al. |
| 2018/0176775 | A1* | 6/2018 | Obaidi ................ G06F 21/53 |
| 2018/0183882 | A1* | 6/2018 | Flynn ................ H04L 67/34 |
| 2018/0183889 | A1* | 6/2018 | Meriac ................ H04L 67/26 |
| 2018/0260200 | A1 | 9/2018 | Karagiannis et al. |
| 2018/0267496 | A1 | 9/2018 | Wang et al. |
| 2018/0307472 | A1 | 10/2018 | Paul et al. |
| 2018/0316655 | A1* | 11/2018 | Mani ................ H04L 61/1541 |
| 2018/0341434 | A1 | 11/2018 | Han |
| 2019/0123967 | A1 | 4/2019 | Dotchkoff et al. |
| 2019/0132236 | A1 | 5/2019 | Rahman et al. |
| 2019/0182333 | A1 | 6/2019 | Bartfai-walcott et al. |
| 2019/0250912 | A1 | 8/2019 | Gavisiddappa kodigenahalli et al. |
| 2019/0306242 | A1 | 10/2019 | Thummalapalli et al. |
| 2019/0372826 | A1 | 12/2019 | Sherr |

OTHER PUBLICATIONS

George, Samuel John et al.; "Cloud Management of Low-Resource Devices Via an Intermediary Device"; U.S. Appl. No. 15/784,042, filed Oct. 13, 2017; 49 pages.

George, Samuel John et al.; "Cloud Modification of Modular Applications Running on Local Devices"; U.S. Appl. No. 15/784,045, filed Oct. 13, 2017; 34 pages.

George, Samuel John et al.; "Distribution of Events in Edge Devices"; U.S. Appl. No. 15/784,046, filed Oct. 13, 2017; 44 pages.

George, Samuel John et al.; "Hierarchical Split of Application Between Cloud and Edge"; U.S. Appl. No. 15/784,048, filed Oct. 13, 2017; 41 pages.

Street, Chipalo et al.; "Deployment of Modular Applications From the Cloud to Local Devices"; U.S. Appl. No. 15/639,419, filed Jun. 30, 2017; 34 pages.

"Non Final Office Action Issued in U.S. Appl. No. 15/639,419", dated Sep. 27, 2018, 26 Pages.

Kazi, et al., "C2PS: A Digital Twin Architecture Reference Model for the Cloud-Based Cyber-Physical Systems", In the Proceedings of IEEE on Access, vol. 5, Jan. 23, 2017, 13 Pages.

"Understand device twins—preview", Retrieved from: https://github.com/blumu/azure-content/blob/master/articles/iot-hub/iot-hub-devguide-device-twins.md, Oct. 1, 2016, 6 Pages.

Gutierrez, Peter, "Why IoT devices need a 'digital twin'", Retrieved from: https://www.iothub.com.au/news/why-iot-devices-need-a-digital-twin-431339, Jul. 25, 2016, 7 Pages.

Shi, et al., "Edge Computing: Vision and Challenges", In Journal of IEEE Internet of Things, vol. 3, No. 5, Oct. 1, 2016, pp. 637-646.

"International Search Report and Written Opinion Issued in PCT Application No. PCT/US18/026988", dated Jun. 21, 2018, 13 Pages.

"International Search Report and Written Opinion Issued in PCT Application No. PCT/US18/026989", dated Jun. 21, 2018, 13 Pages.

"International Search Report and Written Opinion Issued in PCT Application No. PCT/US18/026990", dated Jun. 21, 2018, 13 Pages.

"International Search Report and Written Opinion Issued in PCT Application No. PCT/US18/026991", dated Jun. 21, 2018, 13 Pages.

Tang, Bo, et al., "A Hierarchical Distributed Fog Computing Architecture for Big Data Analysis in Smart Cities", In Proceedings with ASE BIG Data and Social Informatics, Oct. 7, 2015, 6 Pages.

"Non Final Office Action Issued in U.S. Appl. No. 15/784,045", dated May 28, 2019, 11 Pages.

"Non Final Office Action Issued in U.S. Appl. No. 15/784,042", dated Jun. 28, 2019, 14 Pages.

"Notice of Allowance Issued in U.S. Appl. No. 15/639,403", dated Apr. 11, 2019, 10 Pages.

"Final Office Action Issued in U.S. Appl. No. 15/639,419", dated Mar. 28, 2019, 27 Pages.

(56) References Cited

OTHER PUBLICATIONS

"Non Final Office Action Issued in U.S. Appl. No. 15/784,048", dated Aug. 9, 2019, 20 Pages.
"Non Final Office Action Issued in U.S. Appl. No. 15/639,419", dated Sep. 19, 2019, 18 Pages.
"Notice of Allowance Issued in U.S. Appl. No. 15/784,045", dated Oct. 11, 2019, 7 Pages.
"Non Final Office Action Issued in U.S. Appl. No. 15/784,046", dated Sep. 23, 2019, 23 Pages.
"Non Final Office Action Issued in U.S. Appl. No. 15/639,403", dated Oct. 7, 2019, 9 Pages.
"Final Office Action Issued in U.S. Appl. No. 15/784,048", dated Feb. 6, 2020, 20 Pages.
"Final Office Action Issued in U.S. Appl. No. 15/639,403", dated Mar. 26, 2020, 10 Pages.
"Non Final Office Action Issued in U.S. Appl. No. 15/784,042", dated Apr. 16, 2020, 14 Pages.
"Final Office Action Issued in U.S. Appl. No. 15/784,042", dated Dec. 30, 2019, 14 Pages.
"Final Office Action Issued in U.S. Appl. No. 15/639,419", dated Mar. 10, 2020, 24 Pages.
"Final Office Action Issued in U.S. Appl. No. 15/784,046", dated Mar. 6, 2020, 24 Pages.
Yin, et al., "Edge Network Model Based on Double Dimension", In Proceedings of IEEE 8th Annual Computing and Communication Workshop and Conference, Jan. 8, 2018, pp. 341-346.
"Notice of Allowance Issued in U.S. Appl. No. 15/639,403", dated Jul. 1, 2020, 7 Pages.
"Non Final Office Action Issued in U.S. Appl. No. 15/784,048", dated Aug. 25, 2020, 22 Pages.
"Non Final Office Action Issued in U.S. Appl. No. 15/784,046", dated Sep. 25, 2020, 23 Pages.
"Non Final Office Action Issued in U.S. Appl. No. 15/784,042", dated Oct. 15, 2020, 14 Pages.
"Non Final Office Action Issued in U.S. Appl. No. 15/639,419", dated Nov. 4, 2020, 13 Pages.
"Office Action Issued in European Patent Application No. 18722290.6", dated Nov. 30, 2020, 6 Pages.
"Office Action Issued in European Patent Application No. 18720927.5", dated Dec. 14, 2020, 6 Pages.
"Office Action Issued in European Patent Application No. 18721568.6", dated Dec. 15, 2020, 7 Pages.
"Final Office Action Issued in U.S. Appl. No. 15/784,048", dated Dec. 22, 2020, 25 Pages.
"Final Office Action Issued in U.S. Appl. No. 15/784,046", dated Feb. 8, 2021, 25 Pages.

* cited by examiner

MODULAR APPLICATIONS USING A COMMON PROVISIONING SERVICE

CROSS-REFERENCE TO RELATED APPLICATION(S)

This application claims the benefit of U.S. Provisional Application No. 62/503,787, filed May 9, 2017. The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The devices can also include sensors in buildings and factory machines, sensors and actuators in remote industrial systems, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to IoT technology. In one example of the technology, the following actions are performed for each module of a plurality of modules on a first edge device. An identification message that includes information associated with identification of the module is received. The validity of the module is then verified. After the module is verified, based at least in part on the identification message, an IoT support service is selected from a plurality of IoT support services. The module is then caused to be registered with the selected IoT support service. The plurality of modules are compositable together into an application for the first edge device. The modules of the plurality of modules are capable of being used interoperably with other modules without altering the other modules.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
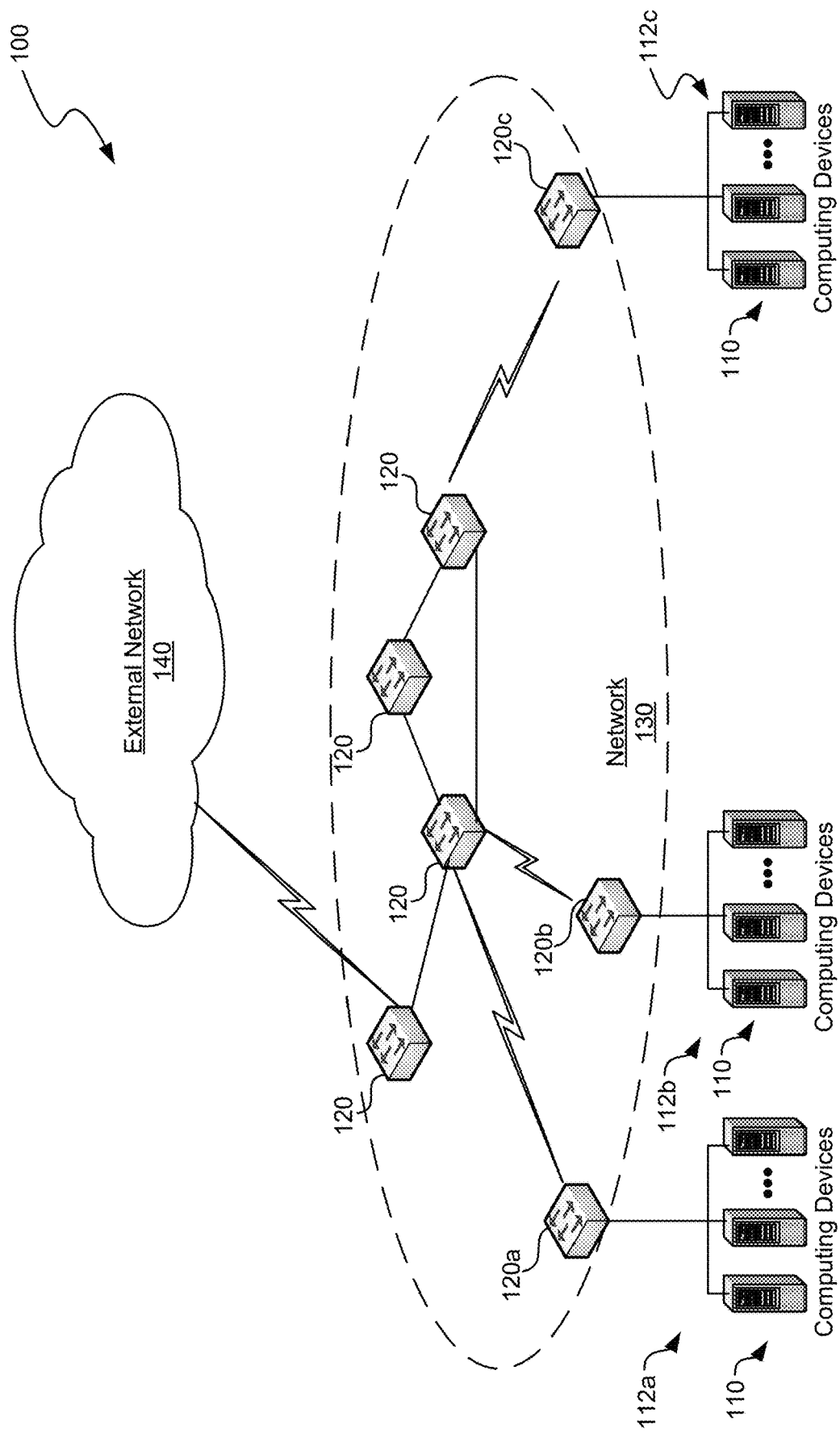
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to IoT technology. In one example of the technology, the following actions are performed for each module of a plurality of modules on a first edge device. An identification message that includes information associated with identification of the module is received. The validity of the module is then verified. After the module is verified, based at least in part on the identification message, an IoT support service is selected from a plurality of IoT support services. The module is then caused to be registered with the selected IoT support service. The plurality of modules are compositable together into an application for the first edge device. The modules of the plurality of modules are capable of being used interoperably with other modules without altering the other modules.

IoT devices may communicate with an IoT support service to receive IoT services, either communicating directly with the IoT support service or indirectly via one or more intermediary devices such as gateway devices. Edge devices may include IoT devices and gateway devices. Applications on edge devices may be composed from modules.

In some examples, the modules are re-usable, e.g., they do not depend on being in a specific environment. Instead, the modules can be used with other combinations of modules, e.g., to form a different application. In some examples, each module has the "illusion" that it is the only module present, but can communicate with other modules, and with the IoT support service or other endpoint. In some examples, communications between each module in an application, and with the IoT support service, are all conducted according to a common security context provided by a provisioning service to be used by the modules and by the edge device hardware security.

While mass producing IoT devices, an IoT support service endpoint along with credentials are not typically hard-coded into the IoT device, because, for example, the device manufacturer might not know how the device will be used. In addition, correct provisioning may involve information that was not available at the time that the device was manufactured. Provisioning may be used as part of the lifecycle management of an IoT device that enables "seamless" integration with an IoT support service, with each module being provisioned by the same provisioning service. In a manner of speaking, provisioning may pair modules in IoT devices with a cloud backend based on a number of characteristics such as: the location of the device, the customer who bought the device, and the application in which the device is to be used.

Some examples of the disclosure provide a provisioning service that is a globally available cloud service that acts as a single global endpoint for modules in edge devices to connect to on the front end, has connections to multiple cloud solutions on the backend, and uses routing rules to make sure that modules in IoT devices are provisioned to the appropriate IoT support service. In some examples, the provisioning service is a globally available cloud service that acts as a global endpoint for modules in the cloud; in other examples, the provisioning service is an endpoint within a user's subscription per service endpoint. The provisioning service may select an IoT support service from among multiple IoT support services, and may provision the modules in the edge device to the selected IoT support service. The provisioning service may enable, for each module, the "seamless" creation of its digital twin in the IoT support service. In some examples, all connections to and from the provisioning service are secured.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
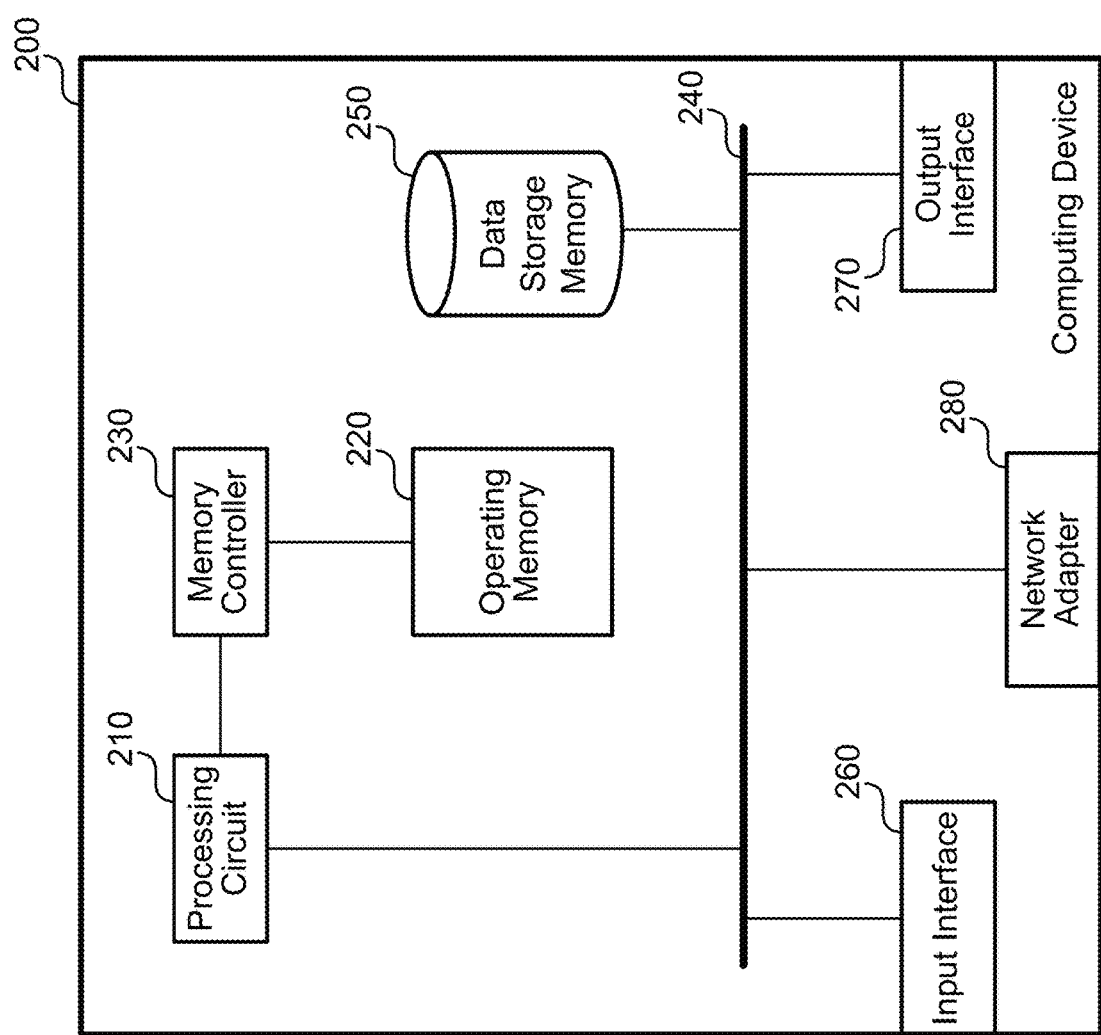
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage memory 250, e.g., eXecute In Place (XIP).

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudostatic random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 28o may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
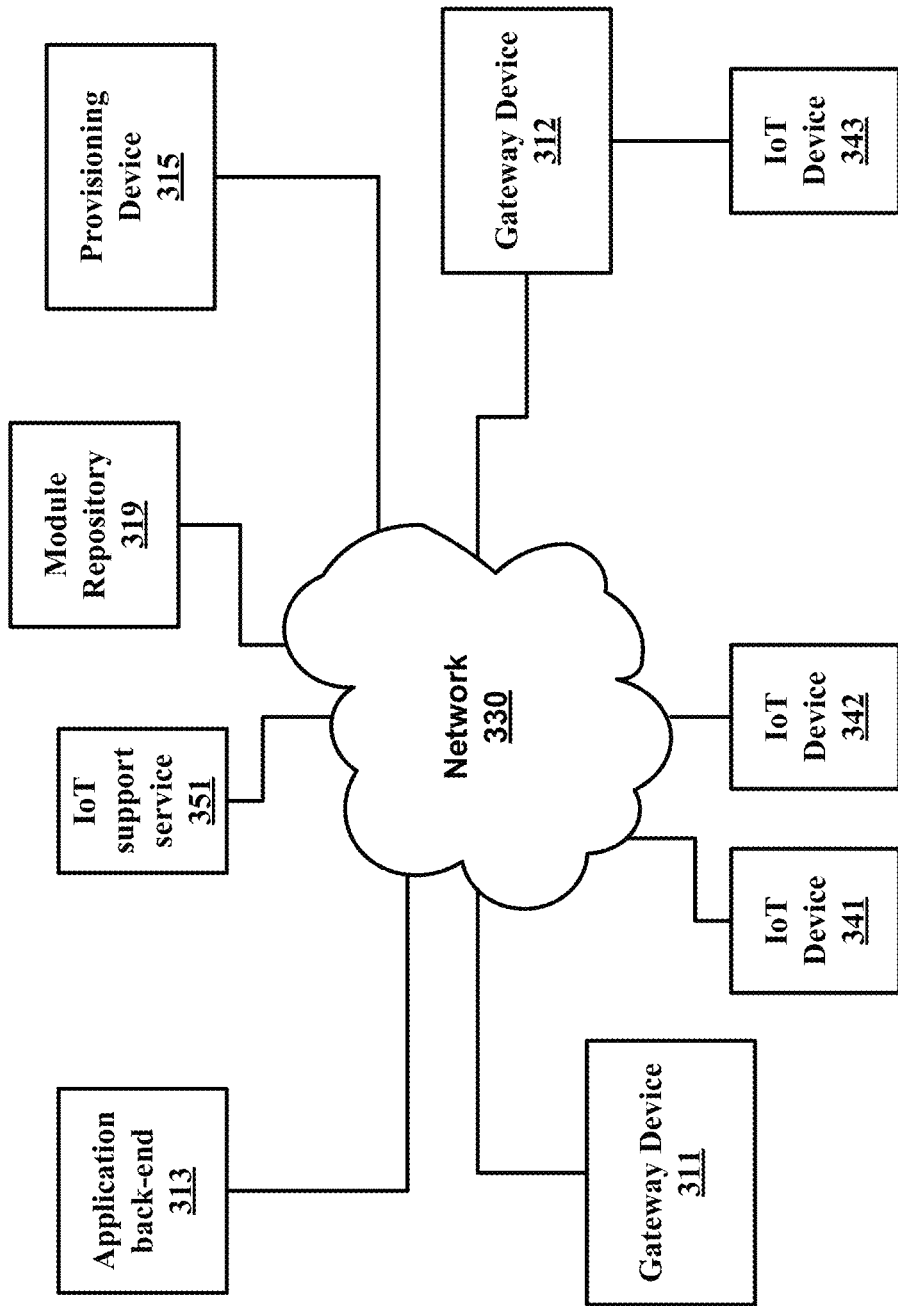
FIG. 3 is a block diagram illustrating an example of a system for IoT communications.

FIG. 3 is a block diagram illustrating an example of a system (300). System 300 may include network 330, as well as IoT support service 351, IoT devices 341-343, gateway devices 311 and 312, provisioning service device 315, and application back-end 313, and module repository 319, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, and/or personalization of settings. However, the foregoing list merely includes some of the many possible users for IoT services. Such services may be employed for, or in conjunction with, numerous other applications, whether or not such applications are discussed herein. In some examples, IoT devices 341-343 and gateway devices 311 and 312 are edge devices, e.g., a connected device other than an IoT support service device or cloud back-end device, whereas IoT support service 351 is a cloud service and/or device.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. For example, application back-end 313 may include a device or multiple devices that perform back-end functions in support of IoT services. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

In some examples, gateway devices 311 and 312 are each a device, or multiple devices such as a distributed system. In some examples, gateway devices may be edge devices that serve as network intermediaries between one or more IoT devices and an IoT support service.

In some examples, provisioning service device 315 refers to a device, or multiple devices such as a distributed system, that perform actions in provisioning an edge device to an IoT support service.

In some examples, module repository 319 refers to a device, or multiple devices such as a distributed system, that store modules for deployment in edge devices (e.g., IoT devices 341-343 and/or gateway devices 311 and 312). In some examples, module repository 319 is not used, and modules for deployment in the edge devices may instead be stored in IoT support service 351 or application back-end 313.

Each of the IoT devices 341-343, and/or the devices that comprise IoT support service 351 and/or application back-end 313 and/or gateway devices 311 and 312 and/or provision service device 315 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341-343, and/or application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341-343 are devices that are intended to make use of IoT services provided by the IoT support service, which, in some examples, includes one or more IoT support services, such as IoT support service 351. IoT devices 341-343 may be coupled to IoT support service 351, directly, via network 330, via a gateway device (e.g., gateway device 312), via multiple gateway devices, and/or the like.

System 300 may include more or less devices than illustrated in FIG. 3, which is shown by way of example only.

Figure 4:
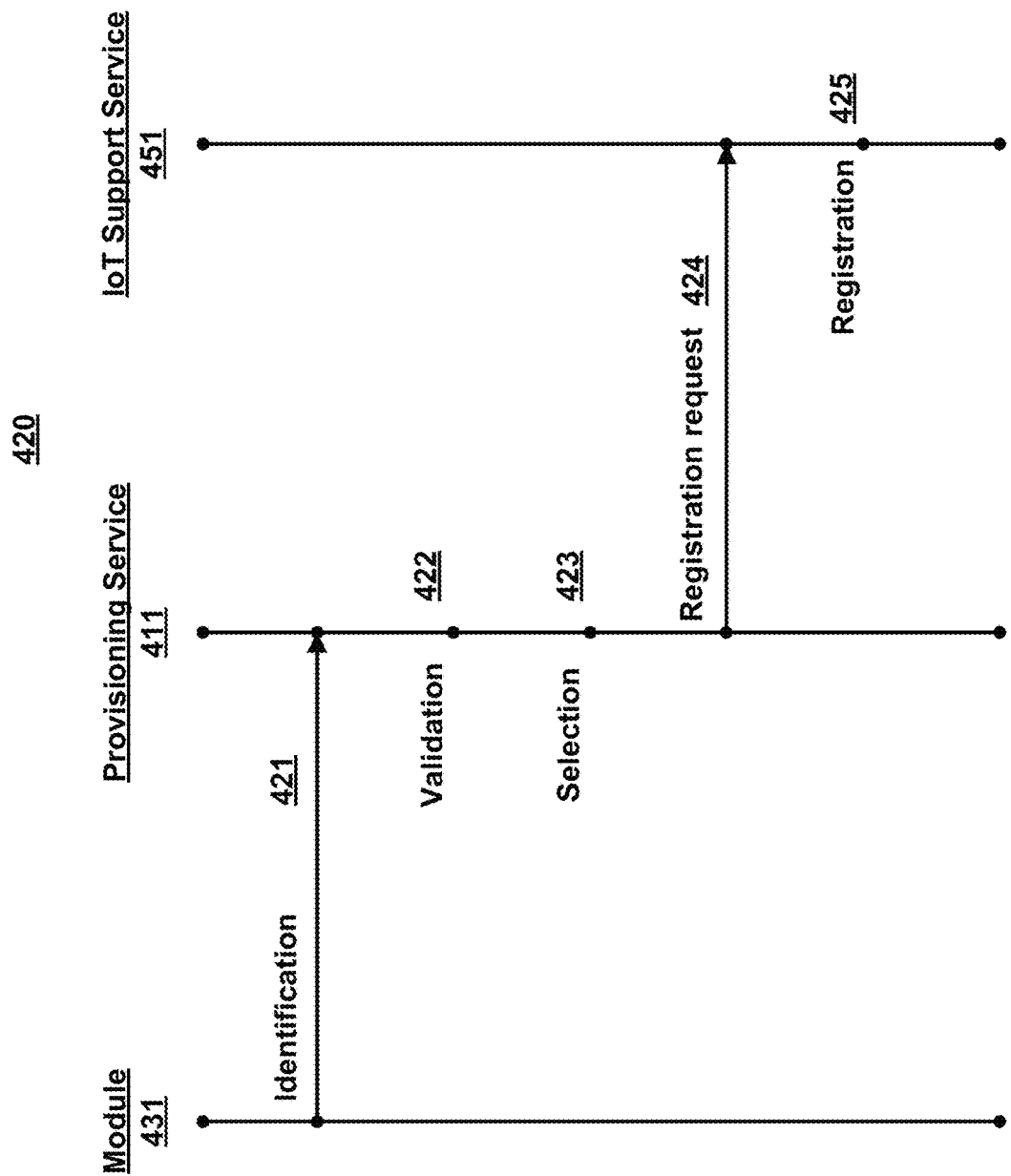
FIG. 4 is a diagram illustrating an example dataflow for a process for IoT communications.

FIG. 4 is a diagram illustrating an example dataflow for a process (420) for IoT communications. FIG. 4 and the corresponding description of FIG. 4 in the specification illustrates an example process for illustrative purposes that does not limit the scope of the disclosure.

Module 431 may be one of multiple modules that compose an edge application in an edge device. In some examples, the modules including module 431 are re-usable, e.g., they do not depend on being in a specific environment. Instead, the modules can be used with other combinations of modules, e.g., to form a different application. In some examples, each module, including module 431, has the "illusion" that it is the only module present, but, after provisioning, can communicate with other modules, and with the IoT support service or other endpoint. In some examples, each module can act in isolation from each other module.

Examples of modules may include logging modules, telemetry modules, analytics modules, artificial intelligence (AI) configuration modules, management modules, sensor reader modules, function modules, and/or the like. In some examples, each of the modules and each component in the IoT support service and other elements of the infrastructure all support a "first-class" notion of modules. A "first-class" notion of modules means that the modules and IoT support service components and other elements of the infrastructure recognize what a module is directly without requiring translation when a module is referenced. In some examples, the use of modules as a first-class notion makes inter-module communication and cloud-to-module communication relatively simple after provisioning, because communication to a module can refer directly to the module being communicated to. In some examples, with a first-class notion of modules, modules can be packaged, referred to, and authenticated, and messages can be sent to and from the modules after provisioning.

In some examples, each of the modules is independent. The modules can be composed and distributed among devices in various arrangements without requiring modification to the internal code of modules or of the supporting services, including among heterogeneous devices. For example, modules can be added and/or removed from an edge application without requiring modifications to the code of any of the modules.

Modules can be used in different configurations in different edge applications, e.g., so that one module can be reused among many different edge applications by composing applications from different combinations of modules. In some examples, each module has, in effect, the "illusion" that it is a complete application, and does not have to take into account what else is happening on the device. Each module can act in isolation from other modules on the same device. Declarative communication can be defined to and from individual modules, for example between two modules and/or between a module and a cloud service. In some examples, the modules are reusable across application or other solutions. Modules that compose an edge application may also be built by different parties.

In some examples, an edge application may be composed of modules and an edge runtime functionality. In some examples, the edge runtime functionality may itself also be a module. In some examples, the runtime functionality may perform module management functions such as configuration modules, performing per-module logs and metrics, communication routing between modules and between modules on the cloud, managing offline capabilities of the edge device, assist in the deployment of modules at the direction of the IoT support service, and/or the like.

In some examples, module 431 and provisioning service 411 have the following starting point. First, the edge IoT device that includes module 431 stores the endpoint it is to connect with in order to be automatically provisioned. For instance, the endpoint uniform resource indicator (URI) may be installed in the factory. In some examples, on first power-up and first boot-up, module 431 is cryptographically guaranteed to connect to provisioning service 411. Also, the edge device that includes module 431 stores identity information about itself as well as optional metadata, which may include geolocation, in some examples. Further, provisioning service 411 may have some method to verify the identity of module 431. The source used to verify the identity of module 431 may provide provisioning service 411 with additional metadata. Provisioning service 411 may also contain a rule engine used to route a module's provisioning request to the correct IoT support service. For example, one rule may be for all modules for all edge devices within a certain geographic region to be provisioned to an IoT solution located in a certain region. Provisioning service 411 may be configured with information about how to connect a module to one or more IoT support services each corresponding to a separate IoT solution.

In the illustrated example, upon the edge device including module 431 first being powered on by a customer, step 421 occurs. At step 421, an identification message may be communicated from module 431 to provisioning service 411. The identification message, along with various other communicated messaged discussed herein, may be secured using cryptographic techniques. In some examples, module 431 communicates the identification message directly to provisioning service 411. In other examples, the identification message is communicated from module 431 to provisioning service 411 through one or more intermediary devices, such as a mobile provisioning application device, cloud-to-cloud identity attester, or the like, as discussed in greater detail below.

In some examples, the edge device that include module 431 is manufactured with the URI of provisioning service 411. In some of these examples, step 421 happens upon the edge device that includes module 431 first being powered on. Upon the edge device including module 431 first being powered on, module 431 may send the identification message to provisioning service 411 via the URI of provisioning service 441.

The identification information may include information that is usable for verifying that module 431 is a valid module to receive IoT services, and may also include information for determining which IoT solution is appropriate for module 431, such as geographical information.

As shown, step 422 occurs next. At step 422, in some examples, the provisioning service determines whether or not module 431 is valid. The validity determination may be made in different ways in different examples, which will be discussed in greater detail below. In some examples, if the provisioning service determines that module 431 is not valid, the process ends.

If, instead, provisioning service 411 determines that module 431 is valid, step 423 occurs. At step 423, in some examples, provisioning service 411 selects an IoT support service from a plurality of IoT support services. In some examples, the selection of the IoT support service is based on routing rules. In some examples, geographical location may be a factor in the selection of the IoT support service. For example, the closest appropriate IoT support service may be selected in some examples. Another factor in the selection of the IoT support service may be dependent on which IoT solution is appropriate based on factors relevant to the IoT device and determined by the IoT device manufacturer. For example, all smart building IoT devices from a manufacturer may use a particular IoT solution and therefore select the corresponding IoT support service, while smart toasters from that manufacturer may go to a different IoT solution and therefore select the corresponding IoT support service.

In this example, step 424 occurs next. At step 424, a request to register module 431 may be communicated from provisioning service 411 to the selected IoT support service (IoT support service 451). In some examples, the request to register module 431 includes connection information associated with module 431. Next, step 425 occurs. At step 425, IoT support service 451 may register module 431 in a registry in IoT support service 451. As part of the registration at step 425, in some examples, IoT support service 451 creates a separate identifier for module 431. In some examples, by creating a separate identifier for module 431, IoT support service has an identifier for module 431 that maps to module 431 so that IoT support service 451 can properly communicate with module 431.

Although not shown in FIG. 4, in some examples, next, cryptographic information about module 431 is communicated from IoT support service 451 to provisioning service 411, and in turn the cryptographic information about module 431 is communicated from provisioning service 411 to module 431. As part of this communication, IoT support service 451 may queue up commands for module 431, or queue up commands to be sent for module 431 to complete subsequently. This completes the provisioning process in this example. The cryptographic information may also include credentials, the hostname of the selected IoT support service 451, connectivity information required for module 431 to connect with IoT support service 451, and the like. In some examples, credentials are not on the edge device that includes the module, and instead the device has a hardware root of trust that is used for creating trust in edge device that includes the module. In other examples, the provisioning process completes in some other manner, or is complete with step 425.

After provisioning is complete, in some examples, communications between module 431 and IoT support service 451 may occur directly and in a normal fashion, and provisioning service 411 are not again involved in communications between module 431 and IoT support service 451, unless, in some examples, module 431 needs to be re-provisioned. In some examples, module 431 sends an initial message to IoT support service 451, such as a welcome packet or the like, and IoT support service 451 returns a message to module 431 with steps that module 431 needs to follow before module 431 may begin sending data to IoT support service 451.

In some examples, module 431 retains cryptographic memory of provisioning service 411 and can be redirected to provisioning service 411 during the lifetime of module 431 in order to re-provision IoT device 411. In some examples, certain events may cause module 431 to initiate re-provisioning, such as the edge device including module 431 being resold, a change in geographical regions, or the like.

In some examples, re-provisioning of an IoT device may be performed as follows. First, a determination is made as to which new IoT support service the IoT device should be attached to (in base data). Next, the IoT device is provisioned in the new IoT support service. Then, the new connection information is returned. The IoT device is then deleted from the registry of the old IoT support service.

In some examples, as a security measure, provisioning service 411 may be restricted from directly connecting to a device without first being contacted by that device. In other examples, provisioning service 411 can directly connect to module 431 without being contacted by module 431, and the security is ensured in some other manner.

Although FIG. 4 discusses in an example in which each module is provisioned individually, in other examples, the device may instead be provisioned as a whole, and then each module communicates to the cloud securely based on the security context provided by the provisioning and by the edge device hardware security. Similarly, in the examples given in FIGS. 5-9 that follows, in some examples, each module may be provisioned separately, or the device may be provisioned as a whole with each module communicated to the cloud via the security context provided by the provisioning and by the edge device hardware security.

Figure 5:
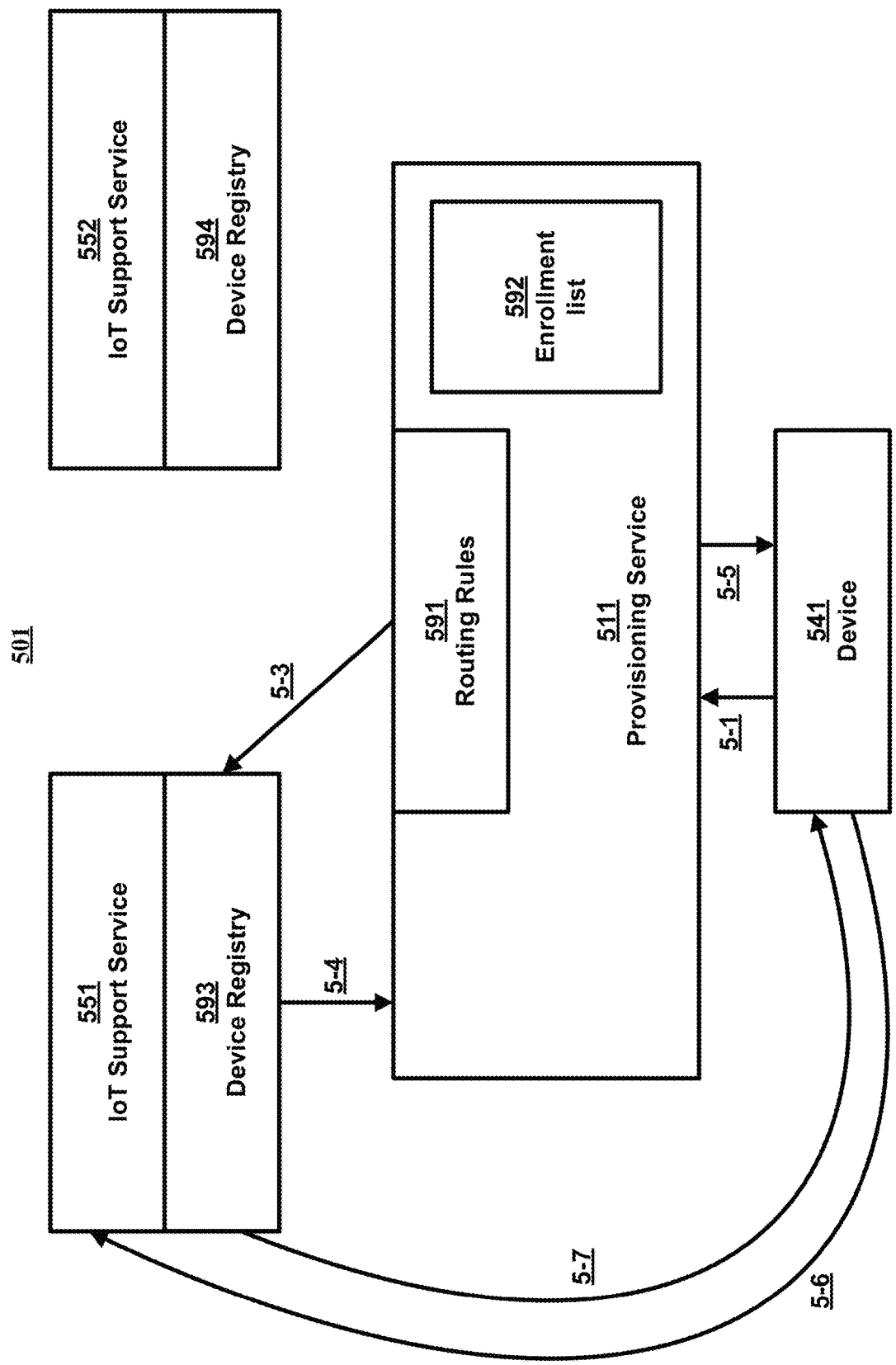
FIG. 5 is a block diagram illustrating an example of a portion of the system of FIG. 3.

FIG. 5 is a block diagram illustrating an example of a portion (501) of system 300 of FIG. 3. Portion 501 includes edge device 541, provisioning service 511, and IoT support services 551 and 552. As shown, provisioning service 511 includes routing rules 591 and enrollment list 592. Also, IoT support service 551 includes registry 593 and IoT support service 552 includes registry 594.

In some examples, edge device 541 is manufactured with the URI of provisioning service 511 installed therein.

In some examples, edge device 541 is also manufactured with identification information for edge device 541 installed therein. In some of these examples, edge device 541 is also manufactured with other manufacturer set data. The identification information may include the device identity (ID), the manufacturer set data, and, in some examples, base data including other information that may be relevant in terms of selecting an IoT solution, such as geographical data. In some examples, the device identifier is known by the manufacturer of the device.

In some examples, the manufacturer makes a list of device ideas for edge devices eligible to use the IoT services available to provisioning service 511 via an uploaded file, or the like, so that the device identifier of each edge device can be validated.

At step 5-1, edge device 541 contacts the provisioning service endpoint (of provisioning service 511) set at the factory. The device identifier and, optionally, other manufacturer-set data are passed as part of the call.

Next, at step 5-2, provisioning service 511 ascertains the validity of edge device 541 by validating the device identifier and, optionally, other manufacturer-set data against the uploaded base data. In some examples, provisioning service 511 also looks up edge device 541 in the source of base data to find out metadata/hub data about edge device 541 if such data is present.

The validation at step 5-2 may be performed in different ways in different examples. In some examples, enrollment list 592 may include all devices built by a manufacturer that uses one or more IoT solutions associated with the provisioning service that have been programmed with provisioning service 511 as the endpoint to use on first boot up. In other examples, enrollment list 592 may include only devices sold, not all devices built, that use provisioning service 511 as the endpoint for provisioning. In some examples, provisioning service 511 verifies the identity by determining whether or not the provided device identifier is a device identifier included in enrollment list 592. In some examples, other steps are necessary to confirm the device identity. For example, other data provided by edge device 541 may also be used in the verification.

Next, at step 5-3, provisioning service 511 runs routing rules over the data from edge device 541 as well as data from the base data source to find the right IoT support service to register edge device 541 with. Provisioning service 511 registers edge device 541 with the selected IoT support service's (551) registry.

Next, at step 5-4, IoT support service 551 returns cryptographic information about edge device 541 to provisioning service 511.

Next, at step 5-5, provisioning service 511 returns the cryptographic information to edge device 541.

Modules in edge device 541 can now send data directly to IoT support service 551 at step 5-6.

Next, at step 5-7, the metadata of edge device 541 syncs with the metadata stored in the IoT support service's (541) registry.

Figure 6:
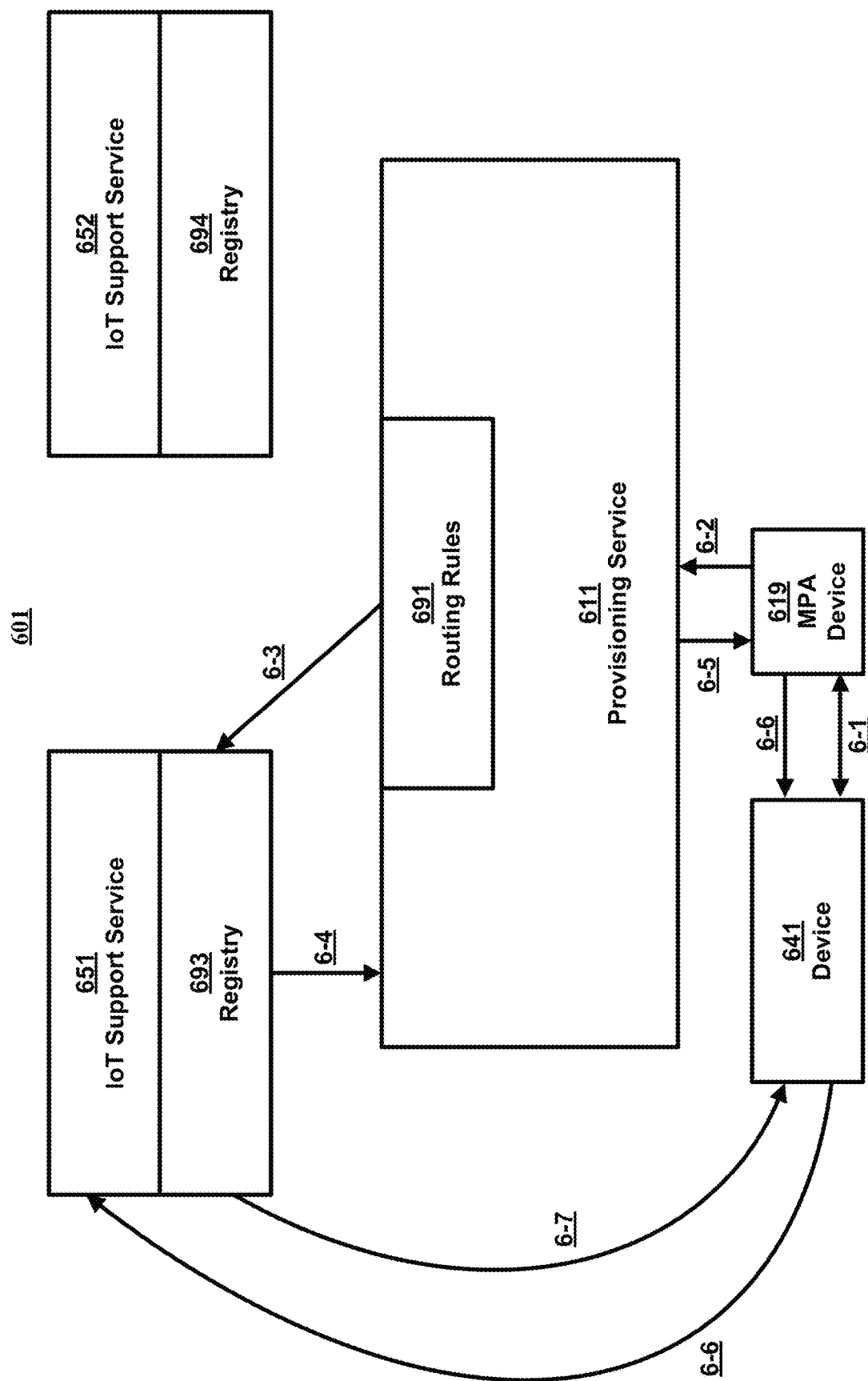
FIG. 6 is a block diagram illustrating another example of a portion of the system of FIG. 3.

FIG. 6 is a block diagram illustrating an example of a portion (601) of system 300 of FIG. 3. Portion 601 includes edge device 641, provisioning service 611, trusted mobile provisioning application (MPA) device 619, and IoT support services 651 and 652. As shown, provisioning service 611 includes routing rules 691. Also, IoT support service 651 includes registry 693 and IoT support service 652 includes registry 694.

In some examples, edge device 641 is manufactured with a secure device identity available via NFC or similar technology. In the example illustrated in FIG. 6, this is the root of trust of edge device 641.

In some examples, edge device 641 is also manufactured with additional information available via NFC or similar technology, and a programmable interface to uploading IoT Hub device credentials onto edge device 641.

In some examples, trusted mobile provisioning application device 619 has a method of reading the device identity of the device via NFC or similar technology, and a way to input additional metadata about the device, such as floor within a building. In some examples, trusted mobile provisioning application device 619 also has a trusted connection to provisioning service 611.

In some examples, the MPA operator enters metadata about the edge device 641 into MPA device 619 before initializing provisioning.

At step 6-1, MPA device 619 scans edge device 641 during installation.

Next, at step 6-2, MPA device 619 contacts the provisioning service endpoint (of provisioning service 611) with information from the edge device (641) scan as well as information input by the MPA operator.

Next, at step 6-3, provisioning service 611 ascertains the validating of the MPA connection. Provisioning service 611 runs routing rules over the data from MPA device 619 to find the right IoT support service to register edge device 641 with. Provisioning service 611 registers edge device 641 with the IoT support service's (651) registry.

Next, at step 6-4, IoT support service 651 returns cryptographic information about edge device 641 to provisioning service 611.

Next, at step 6-5, provisioning service 611 returns the cryptographic information to MPA device 619.

Next, at step 6-6, MPA device 619 passes the cryptographic information along to edge device 641 via the programmable interface of edge device 641.

Modules in edge device 641 can now send data directly to IoT support service 651 at step 6-7.

Next, at step 6-8, the metadata of edge device 641 syncs with the metadata stored in the registry of IoT support service 651.

Although not shown in FIG. 6, some examples of portion 601 may be used for cloud-to-cloud implementations with cloud-to-cloud device identity attestation. In some examples, the example illustrated in FIG. 6 and discussed above is functionally equivalent to what is required for C2C device identity attestation providers to connect their systems to IoT service, replacing "mobile provisioning application device" with "Cloud-to-cloud identity attester."

Figure 7:
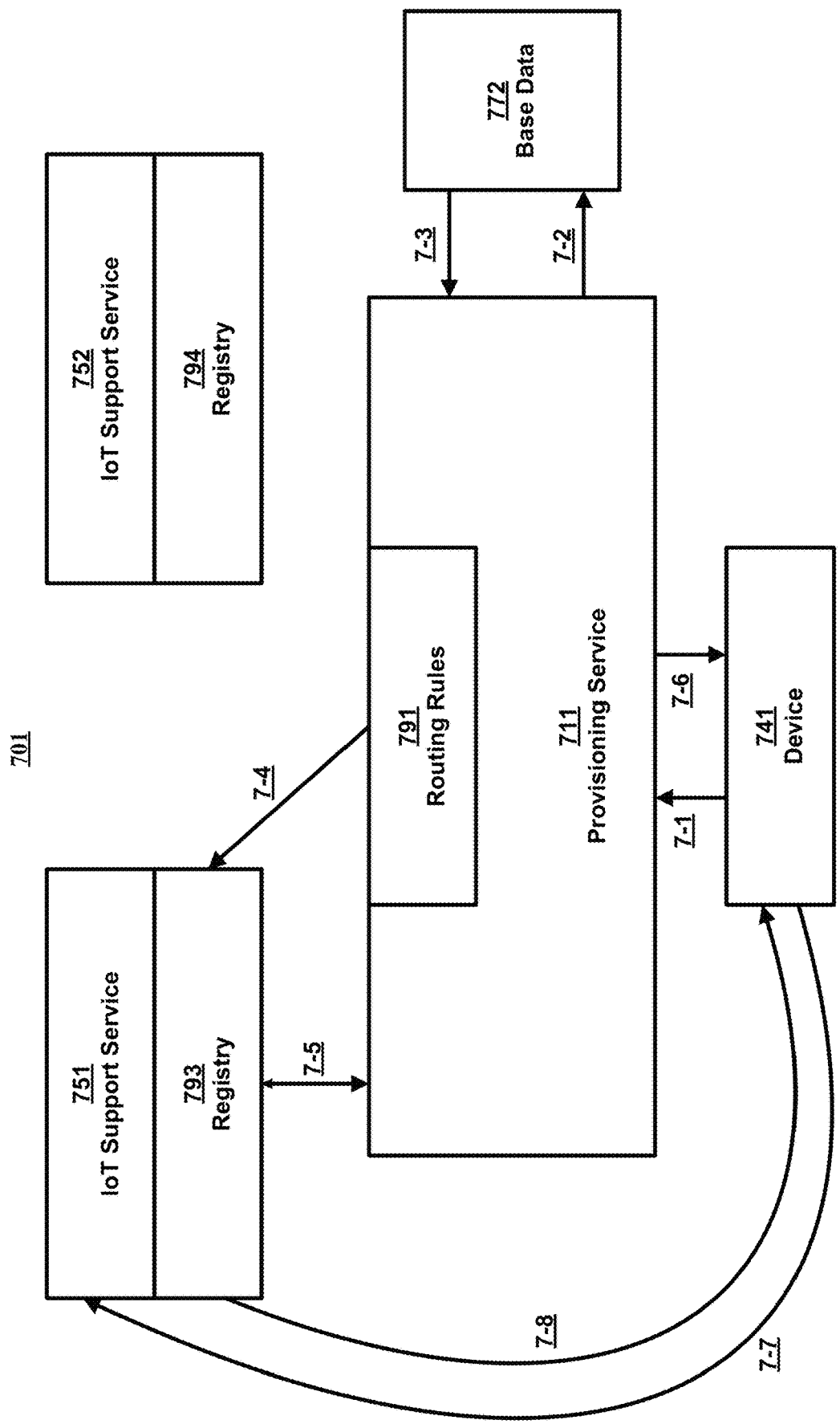
FIG. 7 is a block diagram illustrating yet another example of a portion of the system of FIG. 3.

FIG. 7 is a block diagram illustrating an example of a portion (701) of system 300 of FIG. 3. Portion 701 includes edge device 741, provisioning service 711, source of base data 771, and IoT support services 751 and 752. As shown, provisioning service 711 includes routing rules 791. Also, IoT support service 751 includes registry 793 and IoT support service 752 includes registry 794.

In some examples, a private key (from the private/public key pair) is stored in edge device 741 in secure storage on edge device 741 (via Trusted Platform Module or other similar technology). In the example illustrated in FIG. 7, this is the root of trust of edge device 741.

Also, in some examples, edge device 741 stores an X509 certificate containing the URI of provisioning service 711. In some examples, the X509 certificate also contains the device identifier of edge device 741 and other device metadata for edge device 641.

The signature of the X509 certificate is accomplished using the private key in a secure process. In some examples, the X509 certificate is generated at provisioning time, and in other examples, the X509 certificate is generated at manufacture time. The public key (from the private/public key pair) is made available to the provisioning service to validate the certificate signature.

At step 7-1, edge device 741 contacts the endpoint of provisioning service 711, where the endpoint is set at the factory. The end point is extracted from the X509 certificate, and the signature along with the X509 certificate are passed as part of the call.

At step 7-2, provisioning service 711 ascertains the validating of the X509 certificate by calculating the signature using the public key and comparing with the supplied signature. Provisioning service 711 also looks up the edge device 741 in the source of base data to find out metadata/hub data about the edge device 741.

At step 7-3, provisioning service 711 runs routing rules over the data from edge device 741 as well as data from the base data source to find the right IoT support service to register edge device 741 with.

At step 7-4, provisioning service 711 registers edge device 741 with the registry of IoT support service.

At step 7-5, IoT support service 751 returns cryptographic information about edge device 741 to provisioning service 711.

At step 7-6, provisioning service 711 returns the cryptographic information to edge device 741. All subsequent calls are between modules in edge device 741 and IoT support service 751.

At step 7-7, modules in edge device 741 can now send data to IoT support service 751.

At step 7-8, the metadata of edge device 741 syncs with the metadata stored in the registry of IoT support service 751.

Figures 8, 9:
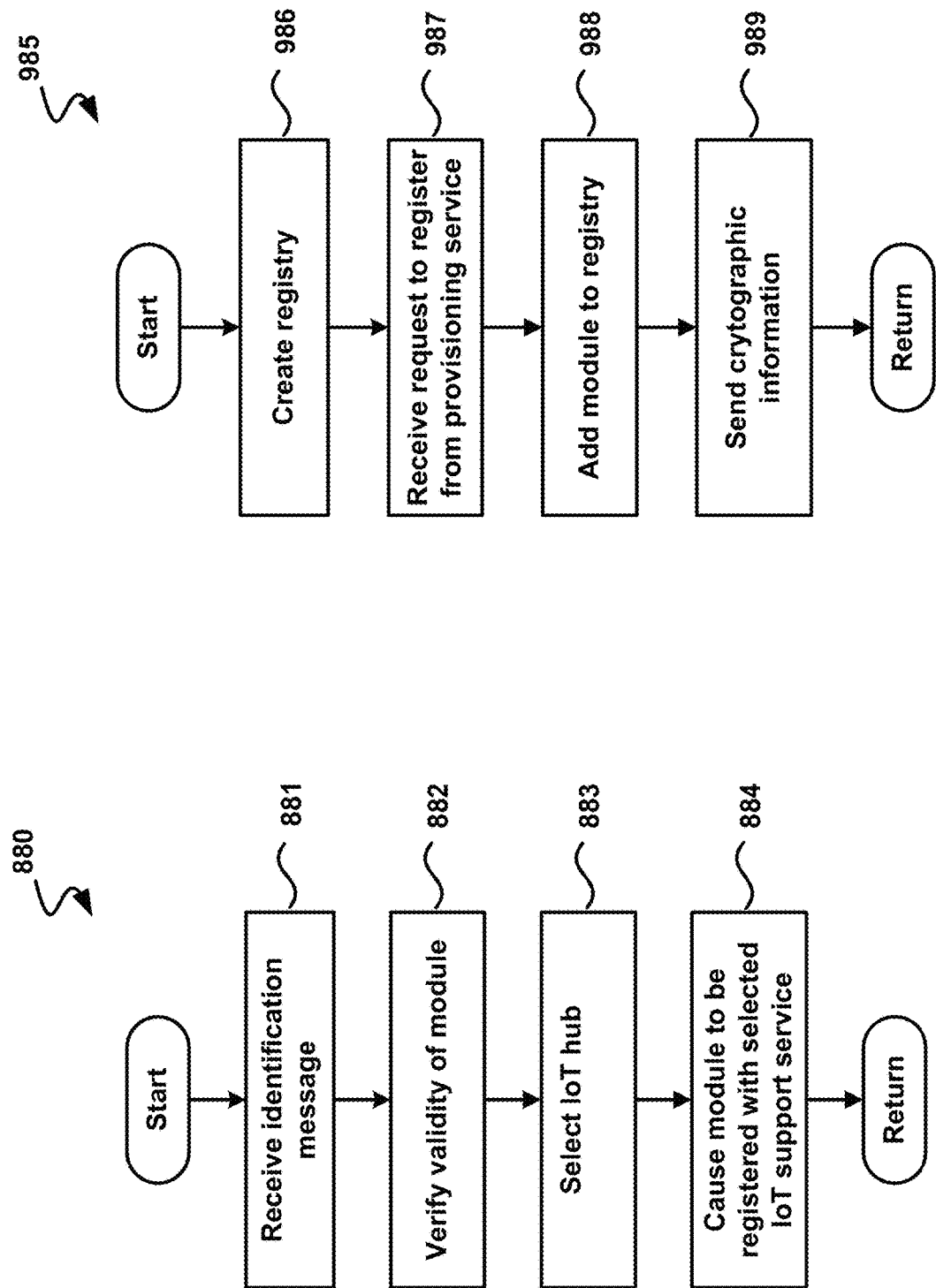
FIG. 8 is a logical flow diagram illustrating an example of a process for IoT communications.
FIG. 9 is a logical flow diagram illustrating an example of another process for IoT communications, in accordance with aspects of the present disclosure.

FIG. 8 is a logical flow diagram illustrating an example of a process (880) for IoT communications. After a start block, the process proceeds to block 881. At block 881, in some examples, an identification message is received. The identification message may include information associated with identification of a module on a first edge device. The process then moves to block 882. At block 882, in some examples, the validity of the module is verified. In some examples, verifying validity of the first edge device includes at least one of: checking a device identification in the identification information against an enrollment list, validating a mobile provisioning application (MPA) connection from which the identification information was received, validating a cloud-to-cloud identity attester connection from which the identification information was received, or validating a certificate in the identification information.

The process then moves to block 883. At block 883, in some examples, based at least in part on the identification message, an IoT support service is selected from a plurality of IoT support services. That is, in some examples, a determination of an IoT support service from a plurality of IoT support services to be associated with the module is made based at least in part on the identification message. The process then advances to block 884. At block 884, in some examples, the module is caused to be registered with the selected IoT support service. The module may be one of a plurality of modules that are compositable together into an application for the edge device. In some examples, the modules of the plurality of modules are capable of being used interoperably with other modules without altering the other modules. The process then proceeds to a return block, where other processing is resumed.

FIG. 9 is a logical flow diagram illustrating an example of a process (985) for IoT communications. After a start block, the process proceeds to block 986. At block 986, in some examples, a registry is created. The process then moves to block 987. At block 987, in some examples, a request is received to register a module from a provisioning service, based on network communications between the provisioning service and the IoT support service, such that a hostname of the provisioning service is a second hostname, the hostname of the IoT support service is the first hostname, and such that the second hostname is different from the first hostname.

The process then advances to block 988, where the module may be added to the registry. The process then proceeds to block 989, where, in some examples, cryptographic information associated with the module is transmitted. The process then moves to a return block, where other processing is resumed.

The provisioning service may enable, for each module, the "seamless" creation of its digital twin in IoT services. The digitals twins of the modules may be referred to as module twins. In some examples, the modules twins each serve as a "cloud representation" of a corresponding module. In some examples, each module twin is a set of securely isolated primitives comprising communication and state synchronization primitives. In some examples, each module twin includes metadata about the corresponding module, such as what type of module it is, various information about the module, as well as relevant information about the device that the module is in (e.g., type of device, capabilities, location, and/or the like, where relevant to the module). In some examples, at least a portion of each module twin is synchronized with the corresponding module. In some examples, the module twins are queryable, and can be used in the answering of queries about the corresponding module. For instance, a query could be made to determine which smart locks in a room are locked, which smart lights in the room are on, or what the temperature is in the room, and the relevant module could respond with the appropriate information.

Each module twin may have its own separate telemetry channel to its corresponding module. When modules are added or removed from devices, the IoT support service may be updated accordingly by adding or removing the corresponding module twins, for example, automatically. In some examples, there may be numerous edge devices, and the IoT support service may store a corresponding module twin for each module of each edge device.

The IoT support services may include services that may perform various functions in the IoT support service. The services may be capable of communication with each other, with other components in the IoT support service, with modules twins, and with modules. The services may include, for example, analytics services, portable translation services, logic services, telemetry components service, module management services, and/or the like.

In some examples, an edge application may be composed of modules and an edge runtime functionality. In some examples, the edge runtime functionality may itself also be a module. In some examples, the runtime functionality may perform module management functions such as configuration modules, performing per-module logs and metrics, communication routing between modules and between modules on the cloud, managing offline capabilities of the edge device, assist in the deployment of modules at the direction of the IoT support service, and/or the like.

As discussed above, in some examples, each module in an application shares the same security context via the provisioning service and by the edge device hardware security. As discussed above, in some examples, each module is separately provisioned, and in another example, the device is provisioned with each of the modules communicated with the cloud based on the security context provided by the provisioning service and by the edge device hardware security.

As discussed above, modules twins may store information about the module, including properties of the module, and of the device that the module is in where relevant. A module twin may include the type of module, type of device that the module is in where relevant to the module, various properties of the module and various relevant properties of the device that the module is in, capabilities of the module, and/or the like. The exact properties stored in the module twin may depend on the type of module. For example, a temperature sensor module of a device may store the current temperature as determined by the module. A module twin associated with the function of a smart device may store the status—for example, whether a smart lock is locked or unlocked, whether a smart light is on or off, and/or the like. At least a portion of the information in the module twin may be synchronized based on the module by updating the information in the module twin based on the module. Also, information in the module twin may be queryable.

In some examples, module twins may include at least tags and properties. In some examples, the properties may include reported properties and desired properties.

In some examples, reported properties indicate the properties of the module as reported to the IoT support service. For example, for an IoT device that is a lock, the module twin associated with a module for the locking function of the smart lock may have a corresponding property indicating whether the reported status is locked or unlocked. In some examples, a desired property indicates the status that the property that the actual device should have at that time. The desired property may be the same as or different than the reported property. If the desired property is different than the corresponding reported property, actions may be taken to resolve the discrepancy.

Some devices may not always be connected, and may instead, for example, connect to the network only a few times per day, or in the case of an error. In these example, data may be buffered locally, and a specific event may trigger a connection and a data upload. Modules twins may then update when a connection occurs. Accordingly, in the case of an intermittently connecting device, a module twin may not be up-to-date until a connection occurs.

In some examples, the IoT support service can deploy modules to edge devices. The deployment may be done for a number of different reasons. For example, modules may be deployed to configure applications on edge devices based on circumstances, to add new functionality to existing edge devices, for the deployment of applications on new edge devices, and/or the like.

For example, modules may be deployed to configure applications on edge devices based on circumstances. For example, it may be determined that a considerable amount of telemetry is coming from a particular IoT device that connects to the IoT support service through a gateway. In response, the IoT support service could deploy a module to the gateway that aggregates the telemetry data. The IoT support service could also or alternately deploy an analytics module to the gateway, where the analytics module performs analytics on the telemetry data, so that the analytics can be done at the gateway rather than sending all of the telemetry data to the cloud. Accordingly, deploying modules to edge devices may be used to configure applications on edge devices on an as-needed or other basis.

Deployment of modules can also be used to add new functionality to an existing edge device. For example, artificial intelligence can be added to an existing edge device. As another example, a thermostat may have been previously adjustable by voice commands, and remotely adjustable, e.g., over a network. The IoT support service could add deploy a machine learning module to the themostat, e.g., so that the themostat could adjust itself based on machine learning. Similarly, IoT support service could deploy a facial recognition module to a camera that did not previously have facial recognition capabilities. If a room contained (1) a connected device capable of receiving voice commands, and (2) connected devices without native voice capability, the IoT support service could provide modules to the connected device without native voice capability and thus enable that connected devices to respond to voice commands.

Deployment of modules can also be used for new edge devices. When a new edge device is provisioned, or placed into a particular environment for the first time, the IoT support service may detect the edge device, and, in response, deploy the modules appropriate for the environment in which new edge device is placed. For example, if the motion sensors in a particular room are configured in a certain way with certain module, and a new motion sensor is placed in the room, the IoT support service can configure the new motion sensor with modules similar to the other motions sensors in the room.

In this way, edge devices need not include any code other than that for provisioning and responding to deployment instructions from the IoT support service. The edge devices need not have any code for performing their particular functions and/or have any IoT functionality, until after the code is caused to be deployed thereto by the IoT support service. In this way, a customer can buy a "vanilla" connected device that does not include code for performing the "intended" functions of the device. Instead, in some examples, the edge device will connect to cloud, and the IoT support service will deploy the modules for such functionality to the edge device.

When new modules are deployed to an edge device, in some examples, the new modules may be provisioned in a manner discussed above, or, in other examples, rather than provisioning occurring for the new module(s), the new module(s) may make use of the provisioning already performed by the device for secure communications from the new module(s) to the cloud.

The IoT support service may indirectly deploy the modules to the edge devices, in some examples. For instance, the IoT solution may send, to the edge device to which the modules are to be deployed, a command to download the modules from a module repository. In other examples, the IoT support service may directly send the modules to the edge device. For example, module repository 419 may be omitted from some systems. In other examples, the IoT support service may send, to the edge device to which the modules are to be deployed, a command to download the modules from a module repository, such as module repository 419 of FIG. 4.

When deploying modules, in some examples, the IoT support service determines one or more modules to be deployed and identifies edge device to which to deploy the determined modules. The IoT support service may then cause the determined modules to be deployed to the identified edge device. The IoT support service may also update the module twins based on the deployed modules, so that each of the deployed modules has a corresponding module twin stored in the IoT support service.

In some examples, the deployment of modules to the edge devices is driven by the cloud. In some examples, the IoT support service itself drives the deployment of the modules to the edge devices. In some examples, deployment of the modules may be based on rules in the IoT support service, and in other examples, the set of modules required in particular edge devices may be determined by an IoT solution operator and communicated to the IoT support service. The IoT support service could then deploy the modules accordingly. In other examples, a back-end application in the application back-end may drive deployment of modules to the edge devices.

Cloud deployment of modules to edge devices may have many benefits, including re-use of code. Some functionality may be re-used across many different solution and types of devices. For example, the same artificial intelligence module may be re-usable across many types of solutions and/or across many types of edge devices. Similarly, the same analytics module may be reusable across many types of solutions and/or across many types of edge devices. In these examples, the same module with the same code can be deployed to many different edge devices, which may include different types of edge devices, without requiring modification of the code in the modules deployed or in the other modules already present in the edge devices to which the modules are deployed.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for Internet of Things (IoT) communication, comprising:
a provisioning service including one or more devices, the devices including at least one memory adapted to store run-time data for the devices, and at least one processor that is adapted to execute processor-executable code that, in response to execution, enables the provisioning service to perform actions, including, for each module of a plurality of modules on a first edge device, on a per-module basis:
receiving an identification message, wherein the identification message includes information that is associated with identification of the module;
validating the module;
making a determination of an IoT support service from a plurality of IoT support services to be associated with the module based at least in part on the identification message;
causing a registration of the module with the determined IoT support service, wherein the plurality of modules are combinable together into an application for the edge device, and wherein the modules of the plurality of modules are capable of being used interoperably with other modules without altering the other modules; and
receiving cryptographic information from the determined IoT support service, wherein the cryptographic information includes connectivity information enabling the module on the first edge device to receive IoT services from the determined IoT support service.

2. The apparatus of claim 1, wherein causing the registration of the module with the selected IoT support service includes sending a registration request to the determined IoT support service.

3. The apparatus of claim 1, wherein the identification information includes a device identification associated with the first edge device and geographical information associated with the first edge device.

4. The apparatus of claim 1, wherein validating the module includes at least one of: checking a device identification in the identification information against an enrollment list, validating a mobile provisioning application (MPA) connection from which the identification information was received, validating a cloud-to-cloud identity attester connection from which the identification information was received, or validating a certificate in the identification information.

5. The apparatus of claim 1, wherein the action of making the determination of the IoT support service from the plurality of IoT support services is based on routing rules, wherein the identification information includes a geographical location of the first edge device, and wherein the action of making the determination of the IoT support service from the plurality of IoT support services is based, in part, on the geographical location of the first edge device.

6. The apparatus of claim 1, wherein the actions further include:
sending the cryptographic information to the module.

7. The apparatus of claim 1, wherein the connectivity information is associated with the module connecting to the determined IoT support service.

8. A method for Internet of Things (IoT) communication, comprising:
for each module of a plurality of modules on a first edge device, on a per-module basis:
receiving an identification message that includes information associated with identification of the module;
verifying validity of the module;
based at least in part on the identification message, selecting an IoT support service from a plurality of IoT support services;

causing the module to be registered with the selected IoT support service, wherein the plurality of modules are combinable together into an application for the edge device, and wherein the modules of the plurality of modules are capable of being used interoperably with other modules without altering the other modules; and receiving cryptographic information from the selected IoT support service, wherein the cryptographic information includes connectivity information enabling the module on the first edge device to receive IoT services from the selected IoT support service.

9. The method of claim 8, wherein causing the module to be registered with the selected IoT support service includes sending a registration request to the selected IoT support service.

10. The method of claim 8, wherein the identification information includes a device identification associated with the first edge device and geographical information associated with the first edge device.

11. The method of claim 8, wherein verifying validity of the module includes at least one of: checking a device identification in the identification information against an enrollment list, validating a mobile provisioning application (MPA) connection from which the identification information was received, validating a cloud-to-cloud identity attester connection from which the identification information was received, or validating a certificate in the identification information.

12. The method of claim 8, wherein selecting the IoT support service from the plurality of IoT support services is based on routing rules, wherein the identification information includes a geographical location of the first edge device, and wherein selecting the IoT support service from the plurality of IoT support services is based, in part, on the geographical location of the first edge device.

13. The method of claim 8, further comprising:
sending the cryptographic information to the module.

14. The method of claim 8, wherein the connectivity information is associated with the module connecting to the selected IoT support service.

15. An apparatus for Internet of Things (IoT) communication, comprising:
an IoT support service including one or more devices, the devices including at least one memory adapted to store run-time data for the devices, and at least one processor that is adapted to execute processor-executable code that, in response to execution, enables the IoT support service to perform actions, including:
creating a registry;
for each module of a plurality of modules on a first edge device, on a per-module basis:
receiving a request to register the module from a provisioning service, based on network communications between the provisioning service and the IoT support service, such that a hostname of the provisioning service is a second hostname, the hostname of the IoT support service is the first hostname, and such that the second hostname is different from the first hostname;
adding the module to the registry; and
transmitting cryptographic information associated with the module, wherein the cryptographic information includes connectivity information enabling the module on the first edge device to receive IoT services from the IoT support service.

16. The apparatus of claim 15, wherein the connectivity information is associated with the module connecting to the IoT support service.

17. The apparatus of claim 15, further comprising:
storing a module twin that corresponds to the module such that the module twin includes metadata associated with the module.

18. The apparatus of claim 15, the actions further including causing metadata stored in the first edge device to be synced with metadata stored in the IoT support service.

* * * * *